United States Patent
Farmer

(10) Patent No.: US 7,197,180 B2
(45) Date of Patent: Mar. 27, 2007

(54) SYSTEM OR METHOD FOR SELECTING CLASSIFIER ATTRIBUTE TYPES

(75) Inventor: Michael Edward Farmer, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 758 days.

(21) Appl. No.: 10/375,946

(22) Filed: Feb. 28, 2003

(65) Prior Publication Data

US 2003/0234519 A1    Dec. 25, 2003

Related U.S. Application Data

(63) Continuation-in-part of application No. 10/269,357, filed on Oct. 11, 2002, and a continuation-in-part of application No. 10/269,308, filed on Oct. 11, 2002, now Pat. No. 6,853,898, and a continuation-in-part of application No. 10/269,237, filed on Oct. 11, 2002, and a continuation-in-part of application No. 10/052,152, filed on Jan. 17, 2002, now Pat. No. 6,662,093, and a continuation-in-part of application No. 10/023,787, filed on Dec. 17, 2001, now Pat. No. 7,116,800, and a continuation-in-part of application No. 10/006,564, filed on Nov. 5, 2001, now Pat. No. 6,577,936, and a continuation-in-part of application No. 09/901,805, filed on Jul. 10, 2001, now Pat. No. 6,925,193, and a continuation-in-part of application No. 09/870,151, filed on May 30, 2001, now Pat. No. 6,459,974.

(51) Int. Cl.
*G06K 9/62*  (2006.01)
*B60R 21/16* (2006.01)

(52) U.S. Cl. ...................... 382/160; 382/228
(58) Field of Classification Search ............. 382/159, 382/160, 224, 228, 260, 261
See application file for complete search history.

(56) References Cited

U.S. PATENT DOCUMENTS

| 4,179,696 | A | 12/1979 | Quesinberry et al. ........ 343/7.4 |
| 4,625,329 | A | 11/1986 | Ishikawa et al. ................ 382/1 |
| 4,985,835 | A | 1/1991 | Sterler et al. .......... 364/424.05 |
| 5,051,751 | A | 9/1991 | Gray .......................... 342/107 |
| 5,074,583 | A | 12/1991 | Fujita et al. ................ 280/735 |
| 5,229,943 | A | 7/1993 | Eigler et al. .......... 364/424.05 |

(Continued)

FOREIGN PATENT DOCUMENTS

| GB | 2 236 419 A | 4/1991 |
| JP | 61-66905 A | 4/1986 |
| JP | 61-66906 A | 4/1986 |
| WO | WO02/30717 A1 | 4/2002 |

OTHER PUBLICATIONS

Greg Welch and Gary Bishop, "An Introduction to the Kalman Filter", Sep. 4, 1997.
"GPS-Based Vehicle Tracking" by Jeffrey Pusan from www.securitydriver.com/aic/stories/article-97.html.

*Primary Examiner*—Andrew W. Johns

(57) ABSTRACT

A system or method (collectively "selection system") is disclosed for selecting attributes for a classifier in a sensor system. The selection system selects attribute types using statistical distributions of the attribute values associated with those attribute types. Attribute types not within the selectively identified subset of attribute types can be filtered out before such data is sent to a classifier. The system can use a test data subsystem for storing and accessing actual sensor data. A distribution analysis subsystem can perform statistical analyses on the test data to identify underlying distributions, and to compare individual attribute types to such distributions. An attribute selection subsystem, wherein said attribute selection subsystem selectively identifies a subset of attribute types from said subset of attribute types.

23 Claims, 4 Drawing Sheets

U.S. PATENT DOCUMENTS

| | | | |
|---|---|---|---|
| 5,256,904 A | 10/1993 | Tohbaru | 307/10.1 |
| 5,366,241 A | 11/1994 | Kithil | 280/735 |
| 5,398,185 A | 3/1995 | Omura | 364/424.05 |
| 5,413,378 A | 5/1995 | Steffens, Jr. et al. | 280/735 |
| 5,446,661 A | 8/1995 | Gioutsos et al. | 364/424.05 |
| 5,490,069 A | 2/1996 | Gioutsos et al. | 364/424.05 |
| 5,528,698 A * | 6/1996 | Kamei et al. | 382/100 |
| 5,890,085 A | 3/1999 | Corrado et al. | 701/47 |
| 5,983,147 A | 11/1999 | Krumm | 701/45 |
| 6,005,958 A | 12/1999 | Farmer et al. | 382/100 |
| 6,018,693 A | 1/2000 | Blackburn et al. | 701/45 |
| 6,026,340 A | 2/2000 | Corrado et al. | 701/47 |
| 6,116,640 A | 9/2000 | Tanaka et al. | 280/735 |
| 6,137,909 A * | 10/2000 | Greineder et al. | 382/190 |
| 6,198,998 B1 | 3/2001 | Farmer et al. | 701/45 |
| 6,272,411 B1 | 8/2001 | Corrado et al. | 701/45 |
| 6,317,517 B1 * | 11/2001 | Lu | 382/228 |
| 6,459,974 B1 | 10/2002 | Baloch et al. | 701/45 |
| 6,577,936 B2 | 6/2003 | Farmer | 701/45 |
| 6,662,093 B2 | 12/2003 | Farmer | 701/45 |
| 2002/0164070 A1 * | 11/2002 | Kuhner et al. | 382/159 |
| 2003/0016845 A1 | 1/2003 | Farmer | 382/103 |
| 2003/0031345 A1 | 2/2003 | Farmer | 382/103 |
| 2003/0063803 A1 * | 4/2003 | Lin et al. | 382/224 |
| 2003/0123704 A1 | 7/2003 | Farmer et al. | 382/103 |
| 2003/0133595 A1 | 7/2003 | Farmer et al. | 382/103 |
| 2003/0135346 A1 | 7/2003 | Farmer et al. | 702/150 |
| 2003/0215119 A1 * | 11/2003 | Uppaluri et al. | 382/128 |
| 2005/0169516 A1 * | 8/2005 | Okajima et al. | 382/159 |

* cited by examiner

SYSTEM OR METHOD FOR SELECTING CLASSIFIER ATTRIBUTE TYPES

RELATED APPLICATIONS

This application is a continuation-in-part of application Ser. No. 09/870,151, filed on May 30, 2001, now U.S. Pat. No. 6,459,974; and is a continuation-in-part of application Ser. No. 09/901,805, filed on Jul. 10, 2001, now U.S. Pat. No. 6,925,193; and is a continuation-in-part of application Ser. No. 10/006,564, filed on Nov. 5, 2001, now U.S. Pat. No. 6,577,936; and is a continuation-in-part of application Ser. No. 10/023,787, filed on Dec. 17, 2001, now U.S. Pat. No. 7,116,800; and is a continuation-in-part of application Ser. No. 10/052,152, filed on Jan. 17, 2002, now U.S. Pat. No. 6,662,093; and is a continuation-in-part of application Ser. No. 10/269,237, filed on Oct. 11, 2002; and is a continuation-in-part of application Ser. No. 10/269,308, filed on Oct. 11, 2002, now U.S. Pat No. 6,853,898; and a continuation-in-part of application Ser. No. 10/269,357, filed on Oct. 11, 2002, the contents of each of which are hereby by incorporated by reference in their entirety.

BACKGROUND OF THE INVENTION

The present invention relates in general to a system or method (collectively "selection system") for selecting robust attributes for use in a classifier from a pool of attributes that could potentially be processed by the classifier. In particular, the present invention relates to a selection system that selects attributes on the basis of statistical distributions.

Classifiers are devices that generate classifications out of sensor data collected by one or more sensors. Classification determinations are based on attribute values that associated with attribute types within the sensor data. For example, in a digital picture of a table, the height of the table is an attribute type. Accordingly the numerical value associated with attribute type is the attribute value. In the context of a "height" attribute type, the attribute value could be the number of pixels from top to bottom, or a measurement such as inches, feet, yards, or meters. Attribute values and attribute types are the means by which classifiers generate classifications, and each type of sensor is capable of capturing a potentially voluminous number of attribute types.

Classifications can be generated in a wide variety of different formats, and for a wide variety of different purposes. For example, a classifier in an airbag deployment mechanism could be used to identify the location of the upper torso of the occupant so that the airbag deployment mechanism can track the location of the occupant, an ability useful in making airbag deployment decisions. Another example of a classifier could be in conjunction with an automated forklift sensor, with the sensor system distinguishing between different potential obstacles, such as other forklifts, pedestrians, cargo, and other forms of objects.

In many of the voluminous number of diverse embodiments and contexts of classifiers, classifiers suffer from what can be referred to as the "curse of dimensionality." As different attributes are incorporated into the determination process of a classier, the accuracy of the classifier typically degrades rather than improves. This is in sharp contrast to the way human beings typically function, because humans tend to make better decisions when more information is available. It would be desirable for a selection system to identify a subset of robust attribute types from a pool of potential attribute types. This can preferably be done through the use of actual test data.

It would be desirable for non-robust features to be filtered out so that the accuracy of the classifier is enhanced, and not minimized. By utilizing fewer attribute types, performance can be increased while reducing cost at the same time. Prior art processes for selecting attributes rely either on attribute-to-attribute correlation measures, or by measures such as entropy. It would be desirable if statistical distributions in the processing of the features were used to eliminate redundant attribute types, and select the desired attribute types. Instead of merely calculating the covariance of data point pairs, it would be desirable to evaluate whether different attribute values are from the same underlying distribution.

Such a method of feature selection would be particularly advantageous with respect to classifiers in airbag deployment mechanisms. Frequent movement within the seat area coupled with the high variability of human clothing and appearance requires a better attribute selection process.

SUMMARY OF THE INVENTION

The invention is a system or method (collectively "selection system") for selecting robust attributes for use in a classifier from a pool of attributes that could potentially be processed by the classifier. The selection system identifies a subset of attribute types on the basis of the statistical distributions of the attribute values associated with those attribute types.

The system can selectively identify a subset of attribute types from the potential pool of attribute types by calculating a distribution statistic for the various potential attribute types. Attribute types not within the selectively identified subset of attribute types can be filtered out before such data is sent to a classifier.

The system can use a test data subsystem for storing and accessing actual sensor data in which to test the filter. Such test data is needed to identify underlying statistical distributions. A distribution analysis subsystem can perform statistical analyses on the test data to identify underlying distributions, and to compare individual attribute types to such distributions. An attribute selection subsystem, wherein said attribute selection subsystem selectively identifies a subset of attribute types from said subset of attribute types.

Various aspects of this invention will become apparent to those skilled in the art from the following detailed description of the preferred embodiment, when read in light of the accompanying drawings.

DETAILED DESCRIPTION

The invention is a system or method (collectively "selection system") for selecting robust attributes for use in a classifier from a pool of attributes that could potentially be processed by the classifier. The selection system identifies a subset of attribute types on the basis of the statistical distributions of the attribute values associated with those attribute types.

I. Introduction of Elements and Definitions

Figure 1:
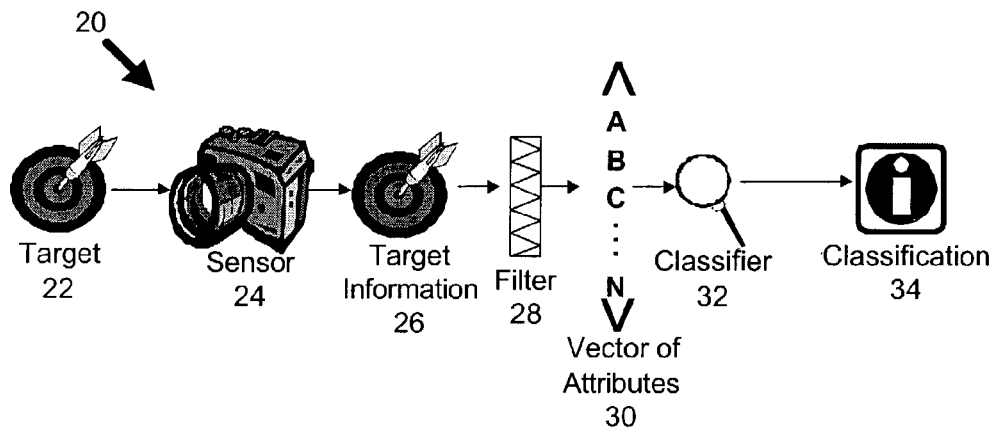
FIG. 1 is a process flow diagram illustrating an example of a process beginning with the capture of sensor data and ending with the classifier deriving a calculation from the captured sensor data.

FIG. 1 is a process flow diagram illustrating some of the elements that are incorporated into a sensor processing system (or simply "sensor system") 20.

A. Target

A target 22 can be any individual or combination of persons, animals, plants, objects, spatial areas, or other aspects of interest (collectively "target" 22) that is or are the subject or target of a sensor 24 used by the system 20. The purpose of the sensor processing system 20 is to accurately capture useful information relating to the target 22. The variety of different targets 22 can be as broad as the variety of different sensor processing systems 20.

In one embodiment of the sensor system 20 (an "airbag deployment mechanism" embodiment or simply an "airbag" embodiment), the output of the sensor system 20 is used by an airbag deployment mechanism. In an airbag embodiment, the target 22 is typically an occupant in a seat in the vehicle. By accurately capturing critical attributes of the occupant, the airbag deployment mechanism can make the appropriate deployment decision. Unnecessary deployments and inappropriate failures to deploy can be avoided by the access of the airbag deployment mechanism to accurate occupant classifications.

In other embodiments of the sensor system 20, the target 22 may be a human being (various security embodiments), persons and objects outside of a vehicle (various external vehicle sensor embodiments), air or water in a particular area (various environmental detection embodiments), or some other type of target 22.

B. Sensor

A sensor 24 can be any type of device used to capture information relating to the target 22 or the area surrounding the target 22. The variety of different types of sensors 24 can vary as widely as the different types of physical phenomenon and human sensation.

Some sensors 24 are optical sensors, sensors 24 that capture optical images of light at various wavelengths, such as infrared light, ultraviolet light, x-rays, gamma rays, light visible to the human eye ("visible light"), and other optical images. In many embodiments, the sensor 24 may be a video camera. In a preferred airbag embodiment, the sensor 24 is a video camera.

Other types of sensors 24 focus on different types of information, such as sound ("noise sensors"), smell ("smell sensors"), touch ("touch sensors"), or taste ("taste sensors"). Sensors can also target the attributes of a wide variety of different physical phenomenon such as weight ("weight sensors"), voltage ("voltage sensors"), current ("current sensor"), and other physical phenomenon (collectively "phenomenon sensors").

C. Target Information

A collection of target information 26 can be any information in any format that relates to the target 22 and is captured by the sensor 24. With respect to embodiments utilizing optical sensors 24, target information 26 is a target image. Such an image is typically composed of various pixels. With respect to non-optical sensors 24, target information 26 is some other form of representation, a representation that can typically be converted into a visual or mathematical format. For example, physical sensors 24 relating to earthquake detection or volcanic activity prediction can create output in a visual format although such sensors 24 are not optical sensors 24.

In many airbag embodiments, target information 26 will be in the form of a visible light image of the occupant in pixels. However, the forms of target information 26 can vary more widely than even the types of sensors 24, because a single type of sensor 24 can be used to capture target information 26 in more than one form. The type of target information 26 that is desired for a particular embodiment of the sensor system 20 will determine the type of sensor 24 used in the sensor system 20.

D. Filter

A filter 28 is potentially any means by which a vector of attributes 30 is extracted from the target information 26. In a preferred embodiment, the filter 28 is exclusively in the form of programmable logic. Such logic can be in the form of hardware, software, or some combination of hardware and software. In other embodiments, the sensor information 26 can be subject to a physical filter 28 to limit the type and quantity of information that is passed along to a classifier 32.

The filter 28 is the mechanism by which only pre-selected types and quantities of information are passed along to the classifier 32. Other attribute types are blocked by the filter. The filter 28 applies a filtration heuristic to eliminate non-robust or non-desirable attributes from the target information 26. The sensor system 20 can incorporate a wide variety of different filtration heuristics. Regardless of the potential heuristic that is applied, only a subset of target information 26 is passed along to the classifier 32. In many embodiments of the system 20, the subset of target information 26 is stored in a vector of attributes 30 that can be passed along to one or more classifiers 36.

Various attribute selection heuristics can be used to select the target information 26 that is to be contained in the vector of attributes 30. Particular attributes can be tested so that each attribute that is passed along to the classifier 30 is a robust, useful, and desirable for inclusion into the filter 28. The attribute selection process is described in greater detail below.

E. Vector of Attributes

A vector of attributes 30 can be any data structure or information format that is capable of transmitting a subset of target information 26 from the filter 28 to the classifier 32. Attributes can be any feature or characteristic of the target information 26. Only attributes relating to the subset of target information 26 are included in the vector of attributes 30. The number of different attributes in the vector of attributes 30 can vary widely from embodiment to embodiment. Consistent with the attribute selection heuristic discussed below, only useful and desirable attributes should be selected for use in the vector of attributes 30.

Each attribute in the vector of attributes 30 can include two components: an attribute type and an attribute value. "Width" is an example of an attribute type. "15 (pixels)" is an example of an attribute value. Each location on the vector of attributes 30 represents a particular pre-defined attribute type. Each numerical value in that location is the attribute value.

F. Classifier

A classifier 32 is any device that receives the vector of attributes 30 as an input, and generates one or more classifications 34 as an output. The logic of the classifier 32 can embedded in the form of software, hardware, or in some combination of hardware and software. In many embodiments, both the filter 28 and the classifier 32 are in the same device.

In some embodiments of the sensor system 20, different classifiers 32 will be used to specialize in different aspects of the target 22. For example, in an airbag embodiment, one classifier 32 may focus on the head of the occupant, while a second classifier 32 may focus on whether the occupant's movement is consistent with the use of a seatbelt.

G. Classification

A classification 34 is any determination made by the classifier 32. Classifications 34 can be in the form of numerical values or in the form of a categorization of the target 22. For example, in an airbag embodiment, the classification 34 can be a categorization of the occupant that does not require any quantitative measure. The occupant could be classified as an adult, a child, a rear facing infant seat, etc. Other classifications 34 in an airbag embodiment may involve quantitative attributes, such as the top-most location of the head, or the location of the upper torso closest to the airbag deployment mechanism.

H. Attribute Space

Figure 2:
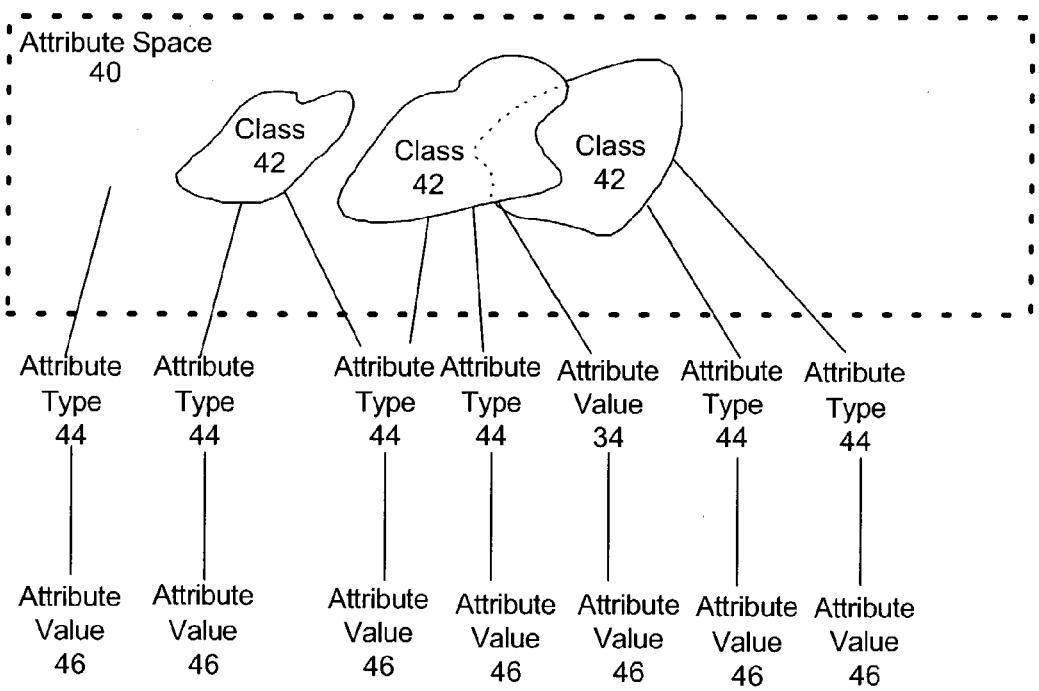
FIG. 2 shows a hierarchy diagram illustrating an example of a hierarchy beginning with the aggregate "attribute space" of sensor-captured "target information" and ending with the individual attribute values that are associated with attribute types.

FIG. 2 is a diagram illustrating the hierarchy from the highest level of an attribute space 40 to an attribute value 46 associated with an attribute type 44 associated with a class 42 within that space.

Attribute space 40 is simply a graphical representation of all of the potential attribute types 44 that can be obtained from the format of target information 26 captured from the sensor 24. The attribute space 40 will vary widely from embodiment to embodiment of the sensor system 20, depending on differences relating to the target 22 or targets 22, the sensor 24 or sensors 24, and the target information 26.

I. Classes

In between the broad expanse of attribute space 40 and the particularity of attribute types 44, is the level of classes 42. Classes 42 are defined in accordance with the goals of the sensor system 20. For example, in an airbag deployment embodiment of the sensor system 20, the airbag deployment mechanism may want to distinguish between different classes 42 of occupants, such as adults, small adults, children, rear facing infant seats (FFIS), front facing infant seats (FFIS), booster seats, empty seats, miscellaneous objects, and indeterminate occupants. Classes 42 are associated with various attribute types 44 and ranges of attribute values 46. In a preferred embodiment, the grouping of attribute types 44 into classes 42 is preferably based on a shared underlying statistical distribution derived from the attribute values 46 associated with the attribute 44. The underlying statistical distribution are discussed in greater detail below. Classes 42 can also be based on a commonality of virtually any other shared characteristic. For example, one class 42 of attributes types 44 could relate to distance measurements, such as height, width, depth, or distance. Classes 42 may relate to two-dimensional measurements such as area. Still other another class 42 may relate to three-dimensional measurements such as volume. The sensor system 20 can incorporate many different types of classes 42. In embodiments using visual representations of sensor measurements, a class 42 of attribute types 44 could relate to color, brightness, luminosity, or some other category. The potential number of different classes 42 can be as unlimited as the number of attribute type 44 categories that can be used to describe phenomenon in the physical world.

As disclosed in FIG. 2, each attribute type 44 need not belong to a class 42. Moreover, in some embodiments, a class 42 may consist of only one attribute type 44. As is disclosed in FIG. 2, classes can overlap with each other, and a single attribute type 44 can belong to more than one class 42. Classes 32 are defined by the designers of the sensor system 20.

J. Attribute Types and Attribute Values

Each entry in the vector of attributes 30 relates to a particular aspect or characteristic of the target information 26. The attribute type 44 is simply the type of feature or characteristic. Accordingly, attribute values 46 are simply quantitative value for the particular attribute 44 in a particular set of target information. For example, the height (an attribute type 44) of a particular object in the target information 36 could be 200 pixels tall (an attribute value 46). The different attribute types 44 and attribute values 46 will vary widely in the various embodiments of the system 20.

Some attribute types 44 can relate to a distance measurements between two or more points in an image representation of the target information 26. Such attribute types 44 can include height, width, or other distance measurements (collectively "distance attributes"). In an airbag embodiment, distance attributes could include the height of the occupant or the width of the occupant.

Some attribute types 44 can relate to a relative horizontal position, a relative vertical position, or some other position-based attribute (collectively "position attributes") in the image representation of the target information 26. In an airbag embodiment, position attributes can include such characteristics at the upper-most location of the occupant, the lower-most location the occupant, the right-most location of the occupant, the left-most location of the occupant, the upper-right most location of the occupant, etc.

Attributes types 44 need not be limited to direct measurements in the target information 26. Attribute types 44 can be created by various combinations and/or mathematical operations. For example, the x and y coordinate for each "on" pixel (each pixel which indicates some type of object) could be multiplied together, and the average product for all "on" pixels would constitute a attribute. The average product for the value of the x coordinate squared and the value of the y coordinate squared is also a potential attribute type 44.

One advantage of a sensor system 20 with pre-selected attribute types 44 is that it specifically anticipates that the designers of the sensor system 20 will create new and useful attribute types 44. Thus, the ability to derive new features from already known features is beneficial with respect to the practice of the invention. In some embodiments, new features can be derived from existing features.

II. Subsystem View

Figure 3:
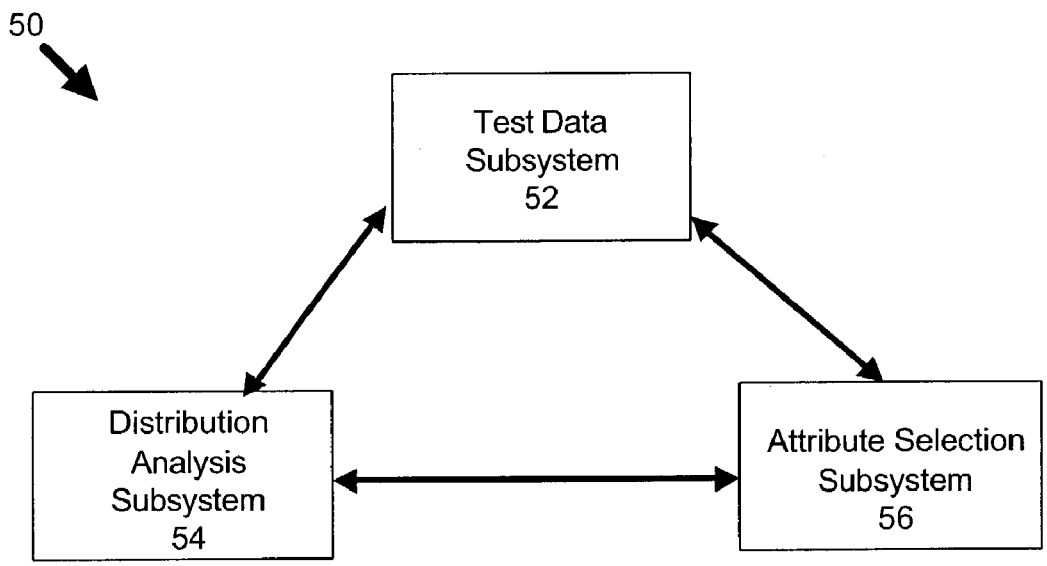
FIG. 3 is a block diagram illustrating an example of a subsystem-level view of an attribute selection system.

FIG. 3 illustrates an example of a subsystem-level view of an attribute selection system ("selection system") 50.

A. Test Data Subsystem

A test data subsystem 52 can be used to capture, store, and access samples of test data. In a preferred embodiment of the selection system 50, the evaluation of attribute types 44 for particular uses is made with the benefit of test data. For example, in an airbag embodiment, actual images of human beings sitting in a vehicle seat should be used to evaluate the attribute types 44, and selectively identify the subset of robust attribute types 44 with respect to occupant classification and tracking. It is the libraries of test data that contain the target information 26 with the various attribute types 44 and attribute values 46. Thus, the test data subsystem 52 includes the potential attribute types 44 from which a subset of robust attribute types 44 are to be selected.

In some embodiments of the test data subsystem 52, the test data subsystem 52 includes a normalization module for converting attribute values 46 into normalized scaled values. In other embodiments of the test data subsystem 42, a redundancy heuristic can be invoked to remove redundant sets of test data. In further embodiments, the redundancy heuristic is a k-nearest neighbor heuristic, described in greater detail below.

B. Distribution Analysis Subsystem

A distribution analysis subsystem 54 is responsible for determining whether two attribute types are from a common class 42. The distribution analysis subsystem 54 generates various distribution statistics from the various attribute values 46 for the various attribute types 44 associated with those attribute values 46. In many embodiments of the selection system 50, the distribution analysis subsystem 54 will create normalized values from the attribute values 46, and use the normalized values in generating the distribution statistics. The normalization process is described in greater detail below. One example of a set of normalized values are a set of scaled values with a minimum value of 0 and a maximum value of 1.

In some embodiments, the distribution statistics are created by invoking a Mann-Whitney heuristic. However, such embodiments can involve more than two classes 42 if desired.

C. Attribute Selection Subsystem

An attribute selection subsystem 56 is responsible for selectively identifying a subset of attribute types 44 from the pool of attribute types 44 in the test data. There are many different selection heuristics that can be applied by the attribute selection subsystem 56.

In one category of embodiments ("threshold embodiments"), the various distribution statistics from the distribution analysis subsystem can be compared to a distribution threshold value. Distribution statistics falling below the predetermined distribution threshold value are removed from consideration.

In another category of embodiments ("top N selection embodiments"), the users of the selection system 50 define a predetermined number of passing attribute types 44. In some embodiments, the attribute selection subsystem 54 can apply expert systems, neural networks, artificial intelligence, and other intelligence technologies (collectively "intelligence") to calculate a desirable number of attribute types 44. The various distribution statistics can be ranked, with only the top N (where N can be any user defined number) are selected. In some "top N selection embodiments" rankings are done by class 42. In such embodiments, the top N attribute types 44 for each class 42 are selected.

In another category of embodiments ("combined statistic embodiments"), combined class statistics are generated with the distribution statistics, with different classes being given different "weights." Attribute types 44 can then be ranked by ranking the combined class statistics affiliated with the attribute types 44.

After the appropriate subset of desirable attribute types 44 are identified, the attribute selection subsystem 54 can embed the appropriate list of attribute types 44 in a filter 28.

III. Attribute Selection Heuristic

Figure 4:
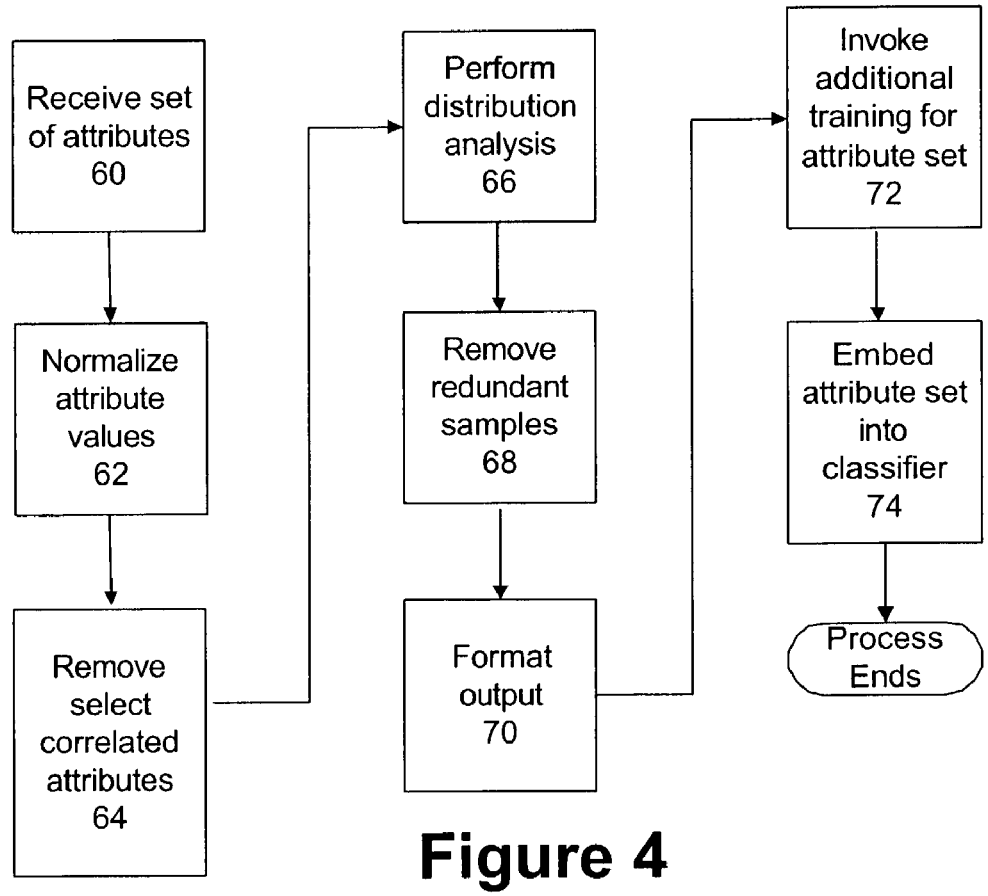
FIG. 4 is a flow chart illustrating an example of the some of the process steps that can be performed in a distribution-based selection heuristic.

FIG. 4 is a flow chart illustrating one example of an attribute selection heuristic. Different embodiments may involve fewer steps, more steps, or different steps.

A. Receive set of Potential Attributes

At 60, the selection system 50 receives a set of potential attribute types 44 into the test data subsystem 52. For the purposes of conducting tests and evaluation, no attribute type 44 need be excluded from the vector of attributes 30. The ability of the selection system 50 to detect statistical distributions is enhanced by large quantities of test target information 26.

B. Normalize Attribute Values

Attribute values 46 are normalized at 62.

The incoming attribute values 46 within the vector of attributes 30 can be converted into scaled values. The process of converting attribute values 46 into scaled values can be referred to as a normalization heuristic.

In a preferred embodiment, the range of normalized values is predetermined before the selection and testing of attributes types 44 begins. A wide variety of different ranges can be used. In a preferred embodiment, the same range of normalized values should be used for all attribute types 44 in a testing sample. The selection system 50 is highly flexible, and can incorporate a wide variety of different predetermined ranges.

In a "min-max" normalization heuristic, attribute values 46 are converted to scaled values (a specific type of normalized value) as low as 0 and as high as 1. This is done after the minimum attribute value 46 is subtracted from all attribute types 44 in the sample. Then all attribute values 44 can be divided by the largest attribute value 46.

In a "mean zero" normalization heuristic, the mean value of the normalized values is set to 0, with a variance of 1. Many other types of normalization heuristics can be used by the selection system 50.

The purpose of normalizing the attribute values 46 into normalized values is to reduce the effects of attribute values 44 of varying dynamic range on the classifier 32. If attribute values 46 are not normalized in some fashion, a single attribute value 46 with a very large dynamic range can dwarf and overwhelm other attributes types 44 and attribute values 46.

The importance of normalizing attribute values 46 can be particularly important in embodiments of the selection system 50 where the target 22 is a human being in motion. In such embodiments, many of the best attribute types 44 can be evaluated in the form of geometric moments or other forms of mathematical moments of the image. Geometric moments can be important, in the areas of pattern recognition, object identification, three-dimensional object pose estimation, robot sensing, image coding and reconstruction. However, such moments can grow monotonically with the order of the moment, and therefore can artificially give increasing importance to the higher order moments. Equation 1 is a mathematical example of a geometric moment, where $M_{pq}$ is the geometric moment.

$$M_{pq} = \sum_{y=1}^{m} \sum_{x=1}^{n} x^p y^q I(x, y) \qquad \text{Equation 1}$$

In a preferred embodiment, target information 26 is either captured in or converted into a two-dimensional format. For example, a video camera captures target information 26 in the form of various pixels with various luminosity values. Equation 1 can be applied in such an embodiment. In Equation 1 by way of example, $I(x,y)$ is the intensity value at pixel $(x,y)$, and $p, q=0, 1, 2, \ldots N$. If $I(x,y)=1$ for all $x, y$ and if the above equation is correctly scaled then $M_{oo}$ gives the area (in pixels) of the 2D image pattern of interest and $(M_{10}, M_{01})$ gives the coordinates of the center of gravity of the pattern. Thus, the concept of a "geometric moment" can be used to identify the center of gravity of a human being or other target 22. Unfortunately, the basis function $(x^p, y^q)$, while being complete, includes redundancies (e.g. is not orthogonal). Thus, the desirability of using a filter 28.

Scaled values are stored by the selection system 50, for future reference as discussed below. In a preferred embodiment, it is the scaled values and not the attribute values 46 that are used in subsequent selection system 50 processes. Thus, in the discussion below, mention of correlated attribute types 44 or other mathematical operations based on attribute type 44 is actually performed using the scale value for a particular attribute type 44.

In alternative embodiments, some type of weighted combination of the scale value and attribute value 46 can be used. Moreover, the selection system 50 need not invoke a normalization heuristic for subsequent selection system 50 processing.

C. Remove Select Correlated Attributes

Correlated attribute types 44 can be selectively removed at 64. In a preferred embodiment, correlations are calculated for the scaled value associated with the attribute value 46 that is associated with the attribute type 44. Thus, in the discussion below, evaluation of attribute types 44 is an evaluation of scaled values that are associated with the attribute types 44.

Many attribute types 44 in the target image 26 may have a relatively high cross correlation. If two attributes types 32 are highly correlated, it means there is a relatively high amount of similarity or redundancy in the information.

This can trick the classifier 32 into a false sense of confidence (e.g. a high confidence factor without any real additional information) than would otherwise be calculated with respect to a particular classification 34.

To remove correlated attribute types 44, a correlation coefficient must first be calculated between every pair of attribute types 44 for all of attribute types 44 in the sample. The system 20 can incorporate a wide variety of different correlation heuristics. In a preferred embodiment, the correlation heuristic is the mathematical operation disclosed in Equation 2.

Correlation Coefficient $(A,B)=\text{Cov}(A,B)/\text{sqrt}[\text{Var}(A)$
$\quad *\text{Var}(B))]$ Equation 2

$\text{Cov}(A,B)$ is the covariance of attribute type A with attribute type B. $\text{Var}(A)$ is the variance of the attribute type A over all of the attribute types 44 in the sample of potential attribute types 44.

The correlation coefficient can be compared to a correlation threshold. If the correlation coefficient for a particular attribute type 44 exceeds the correlation threshold, that particular attribute type 44 can be removed from the sample.

In some embodiments, the correlation threshold is a predetermined threshold. In other embodiments, the correlation threshold is determined after the correlation coefficients have been calculated, based on a predefined number of attribute types 44 "passing" the test. For example, a correlation threshold could be set using statistical data from the various correlation coefficients so that only the top N % of attribute types 44 remain in the sample of attribute types 44. Attribute types 44 not in the top N % can be removed, without the need to be subjected to subsequent testing. In still other embodiments, the correlation threshold is determined after the computation of the various correlation coefficients, and that calculation is not based on any predetermined numerical values.

D. Perform Distribution Analysis

A distribution analysis heuristic can be performed at 66. The distribution analysis heuristic can use solely statistical means to determine whether particular attribute types 44 are of the same statistical distribution as the other attribute types 44.

In a preferred embodiment, the distribution analysis heuristic is performed on two attribute types 44 at a time (e.g. "pair-based distribution analysis heuristic"). In a preferred embodiment of a pair-based distribution analysis heuristic, the Mann-Whitney test (e.g. Mann-Whitney heuristic") is implemented for each attribute type 44. Other types of mathematical and computational processes can be used as distribution analysis heuristics.

The purpose of the distribution analysis heuristic is to infer if the various attribute types 44 come from the same distribution or from different distributions. In a pair-based distribution analysis where each attribute type 44 is evaluated as part of a pair with the other attribute types 44, any two attribute types 44 in each pair are either of the same distribution, or of two distinct distributions.

Each attribute type 44 can be processed sequentially. For each attribute type 44, all of the scaled values in the test data that correspond to class i (e.g. distribution i) and class j (e.g. distribution j) are extracted and placed in a vector. The scaled values can then be sorted, and the ranks of each scaled value is then recorded. The sums of the ranks for each class can then be computed. A null hypothesis set of statistics ("null statistics") can be computed ("null statistic heuristic") according to Equation 3 and Equation 4.

null_hyp_mean=num_class*(num_class+num_else+
$\quad$1)/2 Equation 3 null_hyp_sigma=$sqrt\{num$_class*num_else*(num_
$\quad$class+num_else+1)$\}$/12 Equation 4

The variable "null_hyp_mean" represents the mean of the null hypothesis set. The variable "num_class" refers to the normalized values belonging to a particular class, while "num_else" is the number of scaled values or normalized values belonging to a different class 42.

An evaluation statistic can then be generated by using a statistic heuristic, such as the calculation in Equation 5.

statistic=(rank_sum_class_*null*_*hyp*_mean−0.5/null_
$\quad$hyp_sigma Equation 5

In the above equation, "ran_sum_class" refers to the sum of the ranks, a variable calculated for each class. After the calculation of the statistic, there are several different processes which can be performed to complete the distribution analysis heuristic.

1. Thresholding Heuristic

One alternative sub-process to complete the distribution analysis heuristic is a thresholding heuristic. In the thresholding heuristic, the statistic is compared to a statistic threshold value. Such a threshold value can be predefined before the thresholding heuristic is performed, or it can be computed after the statistic is generated for all attribute types using any number of different criteria. If the various classes equally separable or roughly equally separable, the statistic threshold can be chosen directly from a confidence in the decision. For example, a confidence of 0.001 means that the threshold is 3.291 according to statistics literature known in the art.

Attribute types 44 with a statistic that exceeds the statistic threshold are kept, while those attribute types 44 with a statistic below the statistic threshold are removed. Use of the thresholding heuristic can lead to any number of attribute types 44.

2. Top N Heuristic

Unlike the thresholding heuristic which can lead to an unpredictable number of attribute types 44 remaining, the top N heuristic find the top N most separable attribute types 44 for each class 42. Any number between 1 and the number of remaining attribute types 44 can be used for N. Attribute types 44 not in the top N are removed. This is a particularly good method if one class 42 is far less separable than other classes 42, as is the case with respect to recognizing the differences between small adults and large children in a vision based occupant application. As discussed above, the number and types of classes 42 that can be used in the sensor system 20 should depend on the goals and desired functionality of the sensor system 20. In an airbag embodiment desiring to impede the deployment of an airbag, the number and types of classes 42 should be adequate for allowing the airbag to deploy when it is desirable to do so, and to preclude the deployment of the airbag when deployment is not desirable. The top N heuristic for calculating the final number of attribute types 44 can incorporate the mathematics of Equation 6.

Final number of attribute types=N*number of classes    Equation 6

3. Combination Statistic

One sub-process that can be used to complete the distribution analysis heuristic is a combination heuristic that involves the calculation of a combination statistic. One example of an combination heuristic is Equation 7.

comb_statistic=sum of absolute value of the statistic for all class pair combinations    Equation 7

The statistic described in Equation 5 can be calculated for all class pair combinations in the attribute type 44 sample. The sum of the absolute values of those statistics can be added together to calculate the combination statistic (comb_statistic) of Equation 7. The combination heuristic provides a combined separability metric. Such an approach may include a weighted sum if it is desirable for the sum to depend on the importance of each class, or some other factor. This method also provides a fixed number of attribute types 44. Alternative combination heuristics outside the scope of Equation 7 can be incorporated into the selection system 50.

E. Delete Redundant Samples

When collecting training samples there is often considerable redundancy in the sample space, or in other words, multiple samples provide very similar or even identical information. This can be particularly true where training samples are collected in collected in a single location such as a classroom of students or any other group of people. When samples of individuals data are taken for entire groups of people, it is more likely that size, clothing style, and other characteristics will be similar. To delete redundant samples at 68, a delete redundant samples heuristic can be invoked by the selection system 20. In a preferred embodiment, the delete redundant samples heuristic is a k-nearest neighbor heuristic.

A k-nearest neighbor heuristic classification on every training sample can be performed against the other training samples. The order for k to be used should be at least two times the value for the end system's k-value if the classifier 32 is to a use a k-nearest neighbor heuristic in the classifier's 36 processing. The k-nearest neighbor heuristic can be an effective methodology with regards to human targets 22 because variability in what people wear is extremely high, and it can be nearly impossible to sensibly parameterize for all possibilities. The k-nearest neighbor heuristic tests the classification of every sample against all remaining attribute types 44 that have not been previously deleted. If the classification 34 is correct and the confidence is 100% (i.e. every k nearest neighbor was of the correct class) then the sample is considered redundant and discarded.

F. Format Output

At 70, selected attribute types are entered into a data format that can be either be embedded into a sensor system 20, or transported to a different testing component for potential application to different testing samples. The selection system 50 is highly flexible, and can incorporate a wide variety of different formats and protocols. The precise locations in the vector of attributes 30 need to be linked to the particular attribute types 44.

G. Invoke Additional Training for Attribute Set

If the users of the selection system 50 desire to subject the subset of selectively identified attribute types to additional tests, those test can be invoked at 72.

H. Embed Attribute Set into Classifier

At 74, the selected attribute types 44 are embedded into the classifier 32, and the filter 28 corresponding to the classifier 32 is configured to remove all attribute values 46 that are not affiliated with the selectively identified subset of attribute types 44. The process ends after the sensor system 20 is embedded with the results of the selection system 50.

IV. Airbag Embodiments

A. Partial Environmental View

Figure 5:
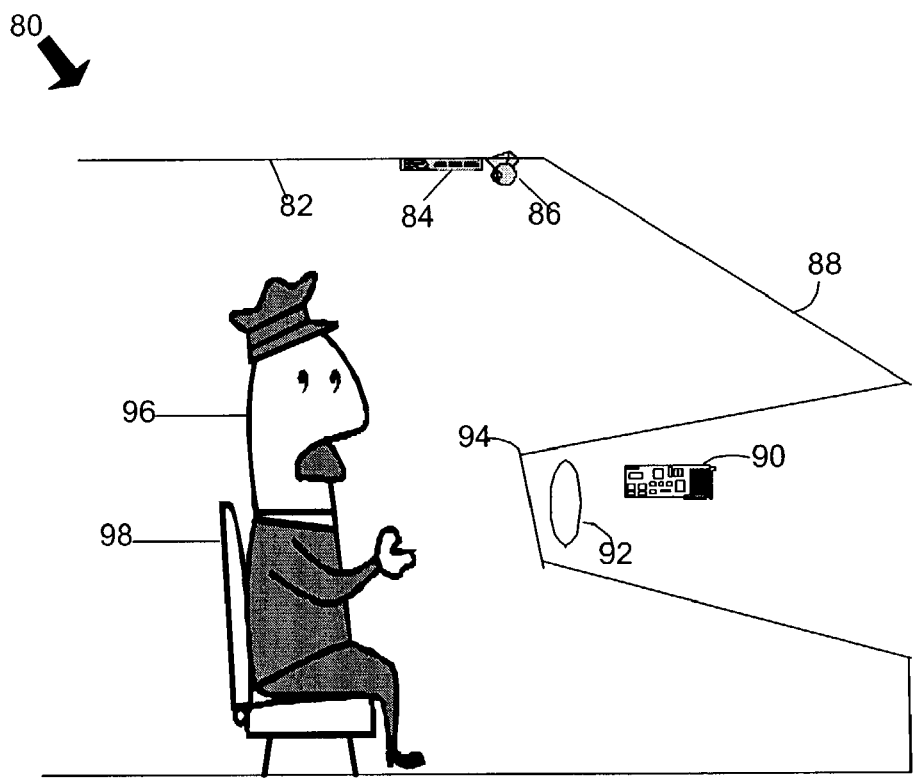
FIG. 5 is a partial environmental view of an automobile with an airbag deployment mechanism using a filter with selectively identified attribute types.

FIG. 5 is a partial view of the surrounding environment for potentially many different airbag embodiments of the sensor system 20, an airbag sensor system ("airbag system") 80. If an occupant 96 is present, the occupant 96 can sit on a seat 98. In some embodiments, a video camera or any other sensor capable of rapidly capturing images (collectively "camera" 86) can be attached in a roof liner 82, above the occupant 96 and closer to a front windshield 88 than the occupant 96. The camera 86 can be placed in a slightly downward angle towards the occupant 96 in order to capture changes in the angle of the occupant's 96 upper torso resulting from forward or backward movement in the seat 98. There are many potential locations for a camera 22 that are well known in the art. Moreover, a wide range of different cameras 86 can be used by the airbag system 80, including a standard video camera that typically captures approximately 40 images per second. Higher and lower speed cameras 86 can be used by the airbag system 80.

In some embodiments, the camera 86 can incorporate or include an infrared or other light sources operating on direct current to provide constant illumination in dark settings. The airbag system 80 can be designed for use in dark conditions such as night time, fog, heavy rain, significant clouds, solar eclipses, and any other environment darker than typical daylight conditions. The airbag system 80 can be used in brighter light conditions as well. Use of infrared lighting can hide the use of the light source from the occupant 96. Alternative embodiments may utilize one or more of the following: light sources separate from the camera; light sources emitting light other than infrared light; and light emitted only in a periodic manner utilizing alternating current. The airbag system 80 can incorporate a wide range of other lighting and camera 86 configurations. Moreover, different heuristics and threshold values can be applied by the airbag system 80 depending on the lighting conditions. The airbag system 80 can thus apply "intelligence" relating to the current environment of the occupant 96.

A computer, computer network, or any other computational device or configuration capable of implementing a heuristic or running a computer program (collectively "computer system" 84) houses the logic of the airbag system 80. The computer system 84 can be any type of computer or device capable of performing the programming logic described below. The computer system 84 can be located virtually anywhere in or on a vehicle. Preferably, the computer system 84 is located near the camera 86 to avoid sending camera images through long wires. An airbag controller 90 is shown in an instrument panel 94. However, the airbag system 80 could still function even if the airbag controller 90 were located in a different environment. Similarly, an airbag deployment mechanism 92 is preferably located in the instrument panel 94 in front of the occupant 96 and the seat 98, although alternative locations can be used by the airbag system 80. In some embodiments, the airbag controller 90 is the same device as the computer system 84. The airbag system 80 can be flexibly implemented to incorporate future changes in the design of vehicles and airbag deployment mechanism 36.

Before the airbag deployment mechanism is made available to consumers, the computer system 84 is loaded with preferably predetermined classes 42 desired by the designers of the airbag deployment mechanism. The computer system 84 is loaded with a list of preferably predetermined attribute types 44 useful in distinguishing the preferably predetermined classes 42. The attribute types 44 are preferably selected using the process disclosed in FIG. 4. Actual human and other test "occupants" or at the very least, actual images of human and other test "occupants" could be broken down into various lists of attribute types 44 that would make up the pool of potential attribute types 44. Such attribute types 44 could be selected from a pool of features or attribute types 44 include features such as height, brightness, mass (calculated from volume), distance to the airbag deployment mechanism, the location of the upper torso, the location of the head, and other potentially relevant attribute types 44. Those attribute types 44 could be tested with respect to the particular predefined classes 42, selectively removing highly correlated attribute types 44 and attribute types 44 with highly redundant statistical distributions. Other steps in FIG. 4 and alternative processes and heuristics can be used so that only desirable and useful attribute types 44 are loaded into the computer system 84.

B. High-Level Process Flow for Airbag Deployment

Figure 6:
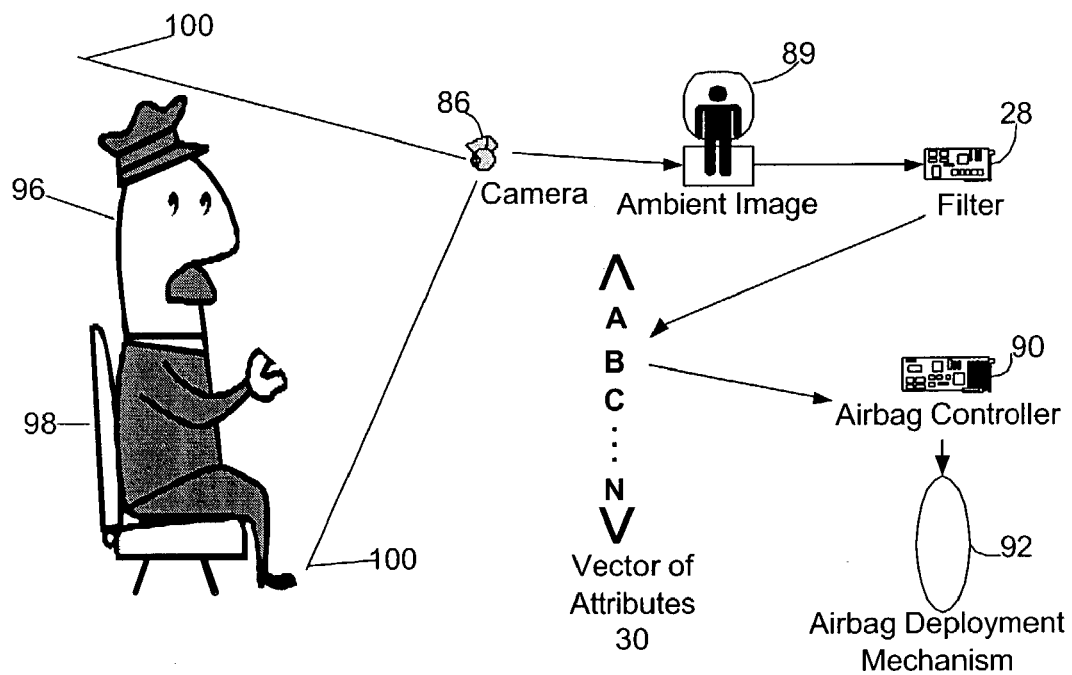
FIG. 6 is a block diagram of an airbag deployment process flow utilizing a filter that filters out all attribute types except those attribute types on an embedded list of pre-selected attributed types.

FIG. 6 discloses a high-level process flow diagram illustrating one example of the sensor system 20 being used in an airbag system 80. An ambient image 89 of a seat area 100 that includes both the occupant 96 and surrounding seat area 100 can be captured by the camera 86. In the figure, the seat area 100 includes the entire occupant 96, although under many different circumstances and embodiments, only a portion of the occupant's 96 image will be captured, particularly if the camera 86 is positioned in a location where the lower extremities may not be viewable.

The ambient image 89 can be sent to the filter 28. The filter 28 receives the ambient image 89 as an input, and sends the vector of attributes 30, a vector populated with the attribute types 44 in accordance with the selection heuristic described above. The vector of attributes 30 can then be analyzed to determine the appropriate airbag deployment decision. This process is also described below. For example, the vector of attributes 30 can be used to determine if the occupant 96 will be too close to the deploying airbag 92 at the time of deployment. The attribute types 44 and attribute values 46 in the vector of attributes 30 can be sent to the airbag controller 32, allowing the airbag deployment mechanism 92 to make the appropriate deployment decision with the information obtained relating to the occupant 96.

C. Detailed Process Flow

Figure 7:
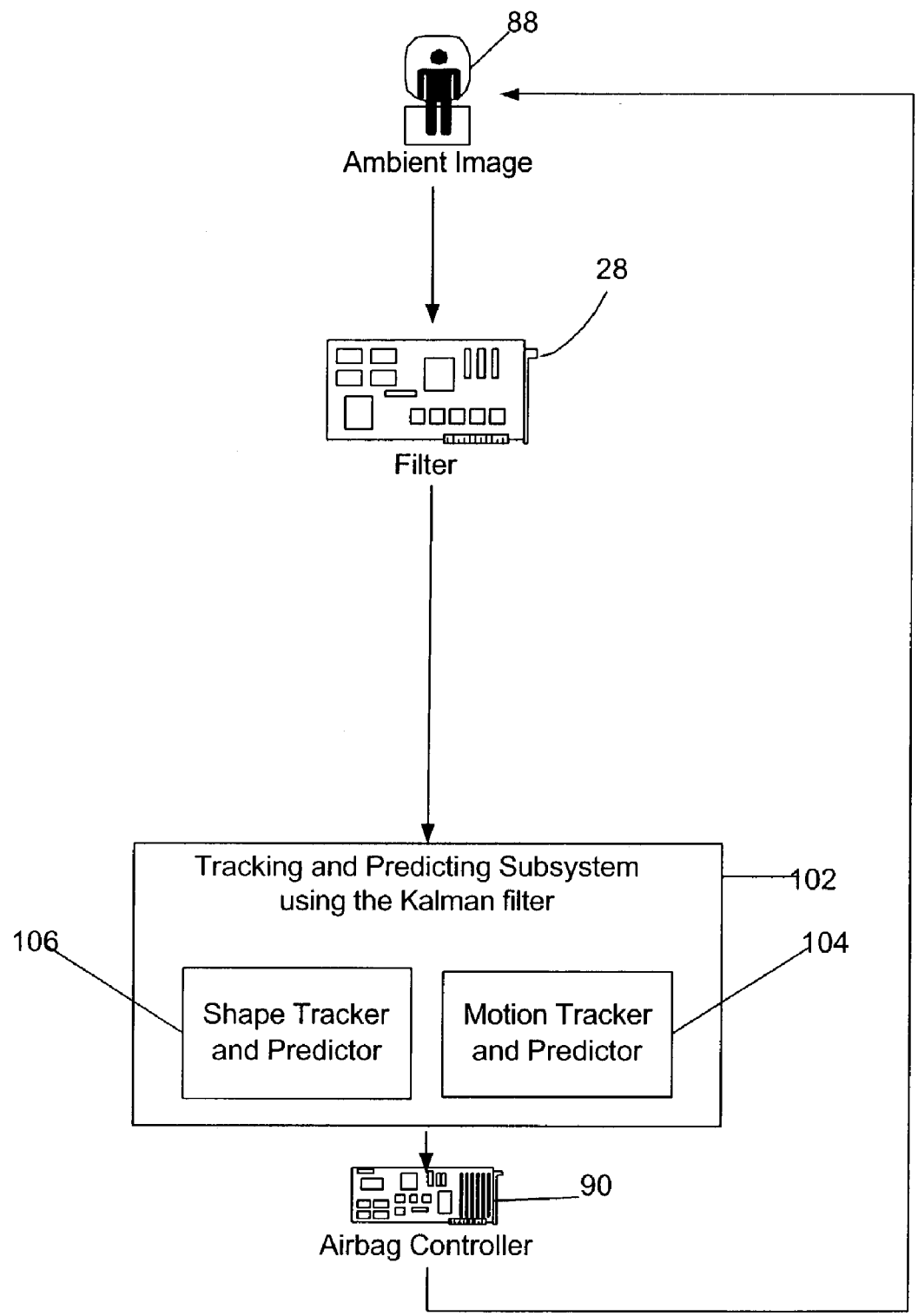
FIG. 7 is a process flow diagram illustrating an example of an airbag deployment mechanism using classifications to track the shape characteristics and motion characteristics of an occupant.

FIG. 7 discloses a more detailed example of the process from the point of capturing the ambient image 89 through sending the appropriate occupant data to the airbag controller 90. This process continuously repeats itself so long as the occupant 96 is in the vehicle. In a preferred embodiment, past data is incorporated into the analysis of current data, and thus a process flow arrow leads from the airbag controller 90 at the bottom of the figure back to the top of the figure.

After an ambient image 89 (which is a specific category of sensor information 26) is captured by the camera 86, it can then be subjected to the filtration heuristic performed by the filter 28. The processes of attribute selection and filtration are described in greater detail above.

The filter 28 allows a shape tracker and predictor 102 to ignore many of the attribute types 44 captured by the camera 86. Key attribute types 44 for deployment purposes typically relate to position and motion characteristics of the occupant 96.

A tracking and predicting subsystem 102 can be used to track occupant 96 characteristics such as position, velocity, acceleration, and other characteristics. In some embodiments, the tracking subsystem 102 can also be used to "extrapolate forward" occupant characteristics, generating predictions of what those characteristics would be in the interim of time between sensor measurements. In a preferred embodiment, the tracking and predicting subsystem 102 uses one or more Kalman filters to integrate past sensor measurements with the most recent sensor measurement in a probability-weighted manner.

The tracking subsystem 102 can incorporate a wide variety of different subsystems that focus on different subsets of occupant characteristics. For example, the tracking subsystem 102 can include a shape tracker and predictor module 106 for tracking and predicting "shape" characteristics and a motion tracker and predictor module 104 for tracking and predicting "motion" characteristics.

The information by the tracking subsystem 102 can then be sent to the airbag controller 90 to effectuate the appropriate behavior by the airbag deployment mechanism 92. In some circumstances, deployment is impeded due to the presence or future presence of the occupant in an at-risk-zone. In some embodiments, airbag deployments can be configured to occur at various strengths, corresponding to the amount of kinetic energy the airbag needs to absorb from the occupant 96. The tracking subsystem 102 can also be used to determine whether or not a collision has occurred, and whether such a collision merits the deployment of an airbag.

V. ALTERNATIVE EMBODIMENTS

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

What is claimed is:

1. A method for configuring a filter for use with a classifier, comprising:
   selectively identifying a subset of attribute types from a plurality of attribute types with a distribution statistic;
   converting an attribute value associated with each attribute type into a scaled value; and
   modifying the filter so that only the subset of attribute types are accessible by the classifier.

2. The method of claim 1, further comprising:
   generating the distribution statistic with a Mann-Whitney heuristic.

3. The method of claim 1, further comprising:
   generating the distribution statistic from a null hypothesis set of statistics.

4. The method of claim 1, further comprising:
   generating the distribution statistic from a number of distribution classes.

5. The method of claim 1, further comprising:
   comparing the distribution statistic to a predetermined distribution statistic threshold.

6. The method of claim 1, further comprising:
   ranking the distribution statistic; and
   eliminating attribute types associated with a ranking that is below a predetermined rank.

7. The method of claim 1, further comprising:
   generating a combined class statistic;
   ranking the combined class statistic; and
   eliminating attribute types from the subset of attribute types that are associated with a ranking that is below a predetermined rank.

8. The method of claim 7, wherein the generating of a combined class statistic includes multiplying the combined class statistic by an importance-based multiple associated with a class.

9. The method of claim 1, further comprising:
   identifying a redundant test sample of attribute types by performing a k-newest neighbor heuristic; and
   eliminating the attribute types in the redundant test sample from the subset of attribute types.

10. The method of claim 9, wherein the redundant test sample is associated with a confidence factor of 100 by the k-newest neighbor heuristic.

11. The method of claim 1, further comprising:
    generating a covariance coefficient from a covariance heuristic;
    comparing the covariance coefficient to a predetermined covariance threshold; and
    removing attribute types from the subset of attribute types where the attribute type is affiliated with a covariance coefficient tat exceeds the predetermined covariance threshold.

12. The method of claim 1, wherein the filter and classifier are used by an airbag deployment mechanism.

13. The method of claim 12, wherein the attribute types are associated wit a visual image of a person capable of being captured by a video camera.

14. A system for selecting attribute types for inclusion in a classifier, comprising:
    a test data subsystem, including a data sample comprising a plurality of attribute types; wherein said test data subsystem further includes a normalization module, said normalization module including a plurality of scaled values, wherein said normalization module generates said plurality of scaled values, and associates said plurality of scaled values with said plurality of attribute types;
    a distribution analysis subsystem, including a plurality of distribution statistics, wherein said distribution analysis subsystem generates said plurality of distribution statistics from said plurality of attribute types; and
    an attribute selection subsystem, wherein said attribute selection subsystem selectively identifies a subset of attribute types from said plurality of attribute types.

15. The system of claim 14, wherein said attribute selection subsystem includes a predetermined threshold value, and wherein said subset of attribute types are selectively identified by comparing said distribution statistics with the predetermined threshold value.

16. The system of claim 14, wherein said distribution analysis subsystem further includes a plurality of combined class statistic, wherein said distribution analysis subsystem generates said combined class statistics from said distribution statistics, and wherein said attribute selection subsystem ranks the attribute types by ranking said combined class statistics.

17. The system of claim 14, wherein said attribute selection subsystem selectively identifies a predefined number of attribute types.

18. The system of claim 14, wherein said data sample includes a subset of redundant data, wherein said test data subsystem includes a redundancy heuristic, and wherein said test data subsystem invokes said redundancy heuristic to remove said subset of redundant data.

19. The system of claim 18, wherein said redundancy heuristic is a k-nearest neighbor heuristic.

20. The system of claim 14, wherein said distribution statistics relate to a plurality of classes.

21. The system of claim 14, wherein said distribution statistics are created with a Mann-Whitney heuristic.

22. The system of claim 14, wherein said subset of selectively identified attribute types are embedded in an airbag deployment mechanism.

23. The system of claim 22, wherein each attribute type in said subset includes an attribute value, and wherein said airbag deployment mechanism includes a video camera for capturing said plurality of attribute values relating to said attribute types.

* * * * *